C. J. REYNOLDS.
SEAL.
APPLICATION FILED DEC. 9, 1916.

1,245,026.

Patented Oct. 30, 1917.

INVENTOR
Charles J. Reynolds
by Wm H. Babcock & Son
Attorneys

UNITED STATES PATENT OFFICE.

CHARLES J. REYNOLDS, OF MELROSE, MASSACHUSETTS.

SEAL.

1,245,026.    Specification of Letters Patent.    Patented Oct. 30, 1917.

Application filed December 9, 1916. Serial No. 135,924.

*To all whom it may concern:*

Be it known that I, CHARLES J. REYNOLDS, a citizen of the United States, residing at Melrose, in the county of Middlesex and State of Massachusetts, have invented certain new and useful Improvements in Seals, of which the following is a specification.

This invention relates to snap seals such as are used for sealing freight cars, coin boxes, meters and other receptacles, articles or structures and has for its chief object to make the fastening of such seals absolutely secure against tampering or accident without the use of any clamping or compressing implement or other additional device, the seal being automatic and no action being required except that of the operator's hand in moving one end of the sealing band into engagement with the other end. More particularly the said invention consists in a sealing band having a bifurcated end and another end provided with a casing, the latter having internal projections or spring ears arranged to engage in notches or recesses of the bifurcations and being also provided with a raised guiding, spacing and locking lug, which is received in the slot between said bifurcations and overlaps the latter, preventing the separation or loosening of the faces of the two ends of the band and thus making the seal self-sealing against tampering.

The said invention further consists in additional improvements in the details of construction and combination, as hereinafter more particularly set forth and claimed.

Although some of the most important features of my invention may be embodied in a sealing band formed from more than one piece, I find it best to make the entire seal from a single blank of sheet metal and the construction of the latter adapted to readily fold into the desired form with creased lines to cause ready fracture and bar surreptitious tampering, constitutes an additional feature of my invention.

Figure 1:
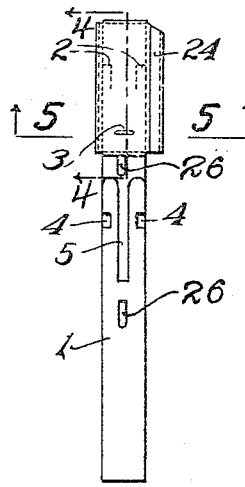
Figure 2:
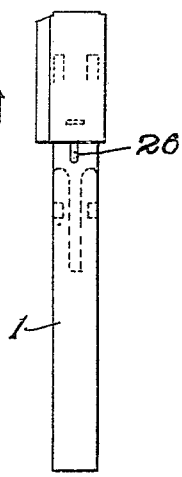
Figure 3:
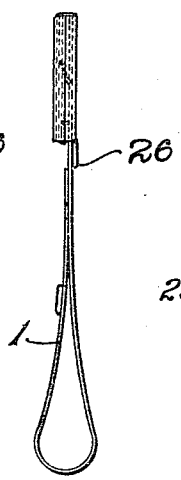
Figure 4:
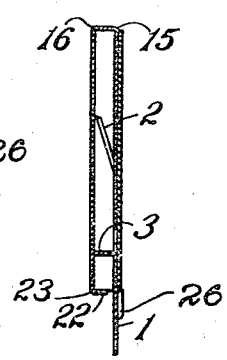
Figure 5:
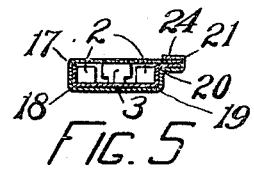
Figure 6:
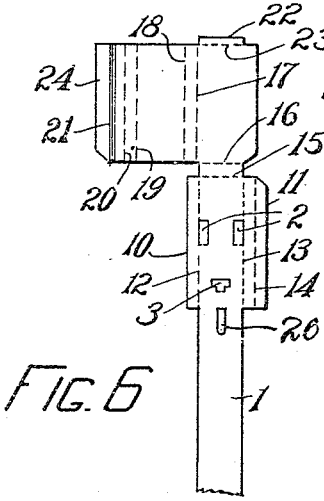
Figure 7:
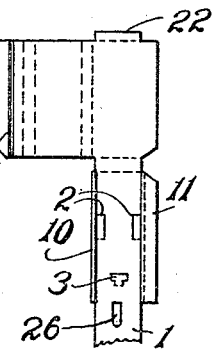
Figure 8:
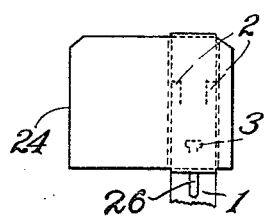

In the accompanying drawings:

Figure 1 represents a front elevation of a seal embodying my invention;

Fig. 2, a rear elevation of the same;

Fig. 3, a side elevation thereof;

Fig. 4, a longitudinal sectional view, on an enlarged scale, on line 4—4 of Fig. 1;

Fig. 5, a cross-section on line 5—5 of Fig. 1;

Fig. 6, a detail plan view of the blank for a one-piece seal;

Fig. 7, a detail front elevation of the blank part for the casing, the band being broken away, showing part 10 folded at right angles to the part 1;

Fig. 8, a similar view, in rear elevation; and

Figure 9:
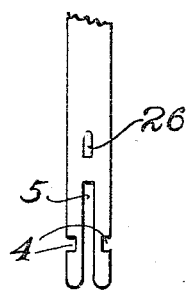

Fig. 9, a detail perspective view of the casing and part of the band, broken away, the front of the casing being partially broken away to show more clearly the internal construction.

My seal comprises a flexible band 1, preferably of a single piece of thin sheet metal, at one end of which is formed, in the blank, an enlargement whereby one portion of this end may be turned over and secured to another portion of the same to form a sealed casing adapted to receive the other end of the band. At the former end, a pair of locking ears 2 are struck up to an inclined position, as shown in Figs. 4 and 9, and also a T-shaped lug 3 is likewise struck up, but into perpendicular position, these parts 2 and 3 being on the inner face of the bottom or back of said casing when the latter is complete. These spring ears 2 and lug 3 respectively coöperating with the notches 4 and slot 5 respectively, as will be later explained, form a very effectual lock, which may not be released without visibly damaging the casing.

Referring to Figs. 6, 7, 8 and 9, I preferably form the sealed casing by first bending the ears 10 and 11 into perpendicular position, bending along the lines 12 and 13, which are shown dotted in Fig. 6. I next turn the ear or flap 11, on the line 14, into parallel position, which brings my blank to the form shown in Fig. 7, but most clearly illustrated in Fig. 5. My next step is to turn the end portion up and over the portion containing the flaps 10 and 11, by bending at the dotted lines 15 and 16. This brings the blank into the form shown in Fig. 8, when I am ready to perform the wrapping movement that is to complete the casing.

I next turn the projecting flap of the end portion downwardly and underneath and across, first inclosing flap 10, then the body portion of band 1, which carries the spring ears 2 and lug 3, and lastly the flap 11, when it is bent around transversely to the band 1 and firmly clenched, as shown in Figs. 5 and 9. These latter lines of bending are indicated successively at 17, 18, 19, 20 and 21, the latter line being creased, notched or perforated to weaken the material at this point to such an extent that it will endure but the one bending.

A lip 22, at the extreme end of this portion is now bent inwardly on the line 23, to form an auxiliary safeguard, as will presently be explained.

By weakening the material along line 21 I make it impossible for anyone to unbend it without breaking off the end strip 24, such mutilation serving notice that the seal has been tampered with.

As will be seen from the following, my other safeguards prevent tampering with the seal in any other manner.

When it is desired to seal a car or receptacle or other article, the slotted end of band 1 is slipped through the usual staple or perforated lug, passed around outside of the latter and underneath the lip 22 of the casing, the slot 5 engaging the shank 25, which just fits snugly in said slot, of lug 3 to hold the two ends of the band closely against itself. As the bifurcated end of band 1 advances into the casing, the bifurcations slide up over the ears 2, slightly depressing them in so doing, until the notches 4 receive the ends of spring ears 2, when the bifurcations and the spring ears 2 will snap back into normal position, the spring ears 2 holding the ends of the bifurcations against withdrawal.

The head of lug 3 prevents the free end of band 1 from being raised from contact with the other end of said band and also prevents the insertion of any bladed instrument in an endeavor to pick the seal and the shank 25, because of its width with relation to the slot 5 prevents any bending of the bifurcations laterally in an endeavor to disengage them from the spring ears 2. Further, the shank 25 prevents the insertion of the free end of the band 1 after a portion has been broken off in breaking the seal in an attempt to give it the appearance of a perfect seal, as the slot 5 is made just long enough to allow the insertion of the bifurcated ends, but when this portion is broken off the end of the broken band will strike against the shank 25, but may not be inserted farther.

The lip 22 serves to close the open end of the casing, with a view to preventing the insertion of any instrument into the casing in an attempt to pick the seal without mutilating it, and also aids in holding the free end of the band 1 in flat position.

If desired, the band may be provided with integral struck up stops 26, limiting the extent or length to which the free end or bifurcated end of the band may be inserted, and the other lug or stop 26 prevents the other end of the casing from being broken off from the casing and partially inserted. This is a desirable feature, but not at all necessary to the satisfactory use of my seal.

Preferably the seal is made of one integral piece of sheet metal, but this is not essential.

Any suitable material may be used, sheet metal of mild resiliency being preferred, however, by me.

Of course, as is obvious, many alterations and modifications may be made in the arrangement, shape, and folding of the blank and other changes may be made in my invention, of which only the preferred form is shown and described herein, without avoiding the scope thereof, and it is my intention to cover all such changes and modification in the appended claims which I desire shall be given their broadest construction consistent with their wording.

Having thus described my invention, what I claim as new and desire to secure by Letters Patent is:

1. A sealing band having its ends provided with parts interlocking against longitudinal separation, one of said ends being also provided with a casing for inclosing said interlocking parts and with means distinct from said interlocking parts and overlapping and in contact with the other end of the band for holding said interlocking parts together.

2. A sealing band having ends interlocking against longitudinal withdrawal and provided at one end with an inclosing casing for the interlocking parts and with means additional to said parts rising from the bottom of said casing and directly acting on the outer face of the other end for preventing the other end of said band from being moved away from the proximate inner face of said casing.

3. A sealing band having one end bifurcated and notched in the sides of its bifurcations and the other end provided with a casing for receiving the former end, said casing being provided with locking spring ears having inclined faces for said bifurcations to ride over in entering the casing, said ears engaging said notched bifurcations to prevent withdrawal and with a lug fitting in the slot between said bifurcations to guide the latter and having lateral parts which overlap said bifurcations, holding the interlocking parts of said end closely face to face.

4. In seals, a casing, in combination with a strap having a bifurcated end and a portion securely held in, and protected by said casing, said portion being provided with means for engaging said bifurcated end to prevent its withdrawal from said casing and with a headed lug additional to said means fitting between the bifurcations of said end and extending laterally over the adjacent parts thereof.

5. A blank for a seal consisting of an elongated flat band having one end bifurcated and laterally notched in the bifurcations and the other end expanded laterally and extending lengthwise to form a casing and also provided along its central longitudinal line with a T-shaped cut out raised part and further having on lines parallel to said line a pair of cut out upwardly inclined parts, all of these cut out parts being in that portion of the blank which will make the bottom of the casing with the T-shaped part then serving as a guiding and locking lug and the two inclined parts serving as spring sealing ears as set forth.

6. A seal comprising a casing and a flexible band having one end fitting within said casing and interlocking therewith, the other end of the band carrying said casing and the latter being formed of transversely folded parts, the exterior and terminal one of which is weakened to be easily frangible in order to disclose by fracture any attempt at opening the casing.

7. In seals, a casing and a strap connected thereto and provided with a bifurcated end, in combination with means located in said casing to engage the bifurcated end of said strap to prevent its withdrawal, and means, fixed to a portion of said strap and located in said casing and covered and protected thereby, fitting between the bifurcations of said end and extending laterally over the adjacent parts thereof.

8. In seals, a casing and a strap integral therewith and provided with a bifurcated end, in combination with means located in said casing to engage the bifurcated end of said strap to prevent its withdrawal, and a T-shaped lug integral with said casing and covered and protected thereby, fitting between the bifurcations of said end and extending laterally over the adjacent parts thereof.

9. In seals, a casing and a strap integral therewith and provided with a bifurcated end, in combination with means located in said casing to engage the end of said strap to prevent its withdrawal and a T-shaped lug integral with said casing and covered thereby, fitting between the bifurcations of said end and extending laterally over the adjacent parts thereof, the length of the stem of said T-shaped lug not exceeding the thickness of said bifurcated end.

In testimony whereof, I have signed my name to this specification.

CHARLES J. REYNOLDS.

Copies of this patent may be obtained for five cents each, by addressing the "Commissioner of Patents, Washington, D. C."